United States Patent [19]
Aardema

[11] Patent Number: 4,832,321
[45] Date of Patent: May 23, 1989

[54] VARIABLE STIFFNESS SPRING SUSPENSION

[75] Inventor: James A. Aardema, Macomb, Mich.

[73] Assignee: The United States of America as represented by the Secretary of the Army, Washington, D.C.

[21] Appl. No.: 217,599

[22] Filed: Jul. 11, 1988

[51] Int. Cl.[4] .......................... B60G 11/14; F16F 1/04
[52] U.S. Cl. .................................. 267/287; 267/166; 267/178
[58] Field of Search ............... 267/286, 287, 288, 289, 267/290, 291, 166–179, 4, 248; 280/724, 725, 726; 254/10.5; 248/624, 625

[56] References Cited

U.S. PATENT DOCUMENTS

| | | | |
|---|---|---|---|
| 1,541,909 | 6/1925 | Early | 267/170 |
| 2,230,340 | 2/1941 | Shreffler | 267/170 |
| 2,625,388 | 1/1953 | Herreshoff et al. | 267/286 |
| 2,904,329 | 9/1959 | Joseph | 267/287 X |
| 2,991,066 | 7/1961 | Fenton | 267/287 |
| 3,151,855 | 10/1964 | Joseph | 267/287 |
| 3,402,923 | 9/1968 | Rhoads et al. | 267/287 |
| 3,459,438 | 8/1969 | Bailey | 280/726 |
| 3,946,987 | 3/1976 | Shultz | 254/10.5 |
| 3,973,314 | 8/1976 | Shultz | 267/287 X |
| 3,982,730 | 9/1976 | Otsuka | 254/10.5 |
| 4,009,867 | 3/1977 | Diffenderfer | 254/10.5 |
| 4,396,408 | 8/1983 | Mace | 267/177 X |
| 4,505,457 | 3/1985 | Okada et al. | 267/177 X |
| 4,558,500 | 12/1985 | Kloster | 254/10.5 X |
| 4,659,052 | 4/1987 | Nagata | 267/177 X |
| 4,679,780 | 7/1987 | Kloster | 267/287 X |

FOREIGN PATENT DOCUMENTS

| | | | |
|---|---|---|---|
| 3021084 | 12/1981 | Fed. Rep. of Germany | 254/10.5 |
| 0804945 | 2/1981 | U.S.S.R. | 267/172 |

Primary Examiner—Douglas C. Butler
Attorney, Agent, or Firm—Peter A. Taucher; David L. Kuhn

[57] ABSTRACT

The invention herein is a coil spring assembly for the suspension of a vehicle including a series of plates whose tapered edges protrude between the coils of the spring. The plates are slideably mounted on bolts parallel to the longitudinal axis of the spring, the bolts being moveable toward or away from the longitudinal axis of the spring. The resulting movement of the plates toward or away from the spring causes a thicker or thinner zone of the tapered edge of the plate to be disposed between the spring coils, thereby changing the degree to which the plates stiffen the spring.

10 Claims, 1 Drawing Sheet

VARIABLE STIFFNESS SPRING SUSPENSION

GOVERNMENT INTEREST

The invention described herein may be manufactured, used, and licensed by or for the Government for governmental purposes without payment to me of any royalty thereon.

BACKGROUND AND SUMMARY

My invention relates to vehicle suspensions and particularly relates to a modification of a spring assembly for vehicles, whether the vehicles are on-road, off-road, or all-terrain vehicles.

Many vehicle suspensions have a piston-and-cylinder type shock absorber mounted between the vehicle frame and a moveable suspension member. This suspension member is typically a rocker arm pivoted to the frame of the vehicle, or to the axle. The shock absorber allows the suspension member only a limited range of movement so that frequently, especially when the vehicle is travelling over rough terrain, the shock absorber repeatedly reaches the limits of its stroke. At the limits of its stroke the shock absorber or a suspension member makes contact with a bump stop device to restrict further motion in that direction.

When the vehicle is travelling while fully loaded, the shock absorber tends to be repeatedly compressed to its minimum-length configuration. On the other hand, when the vehicle is travelling while unloaded, the vehicle body has a greater tendency to rebound upward after experiencing road or terrain shocks, and consequently the shock absorber tends to be extended to its maximum-length configuration. When the shock absorber reaches its maximum or minimum length configuration, it loses its ability to cushion the vehicle from shocks caused by over-road or over-terrain travel. Consequently, passenger fatigue and discomfort are aggravated, and the vehicle cargo and suspension are more easily damaged.

The problems above described are most likely to occur when the mission requirements for existing vehicles change so as to necessitate their carrying of larger loads or traversing more difficult terrain than originally intended. In other cases, a relatively newly designed military vehicle will have been mass produced and be in service all over the world before it is realized that the vehicle suspension is being worn excessively because of the vehicle spring design. In one particular military vehicle known as a High Mobility Multipurpose Wheeled Vehicle (HMMWV or "humvee",) the limited shock absorber stroke has led to unacceptable amounts of wear or breakage in the ball joints connecting wheel assemblies to the vehicle suspension.

One possible solution to the above problem is simply to retrofit vehicles with stiffer springs or higher capacity shock absorbers. However, this solution would make the suspension insensitive to low level shocks or bumps the vehicle receives during over-the-road travel and would thus not afford optimal protection for the vehicle, cargo and passengers. Another possible solution is to retrofit vehicles with variable-pressure pneumatic shock absorbing equipment. However, this would involve the expense of retrofitting vehicles with air pumps and air lines as well as the shock absorbing units themselves. For military vehicles, it would be necessary to modify the vehicles so that the pumps and lines are not vulnerable to enemy fire. This would add to the cost of retrofitting military vehicles with pneumatic shock absorbing means.

My invention is a structure which modifies the existing suspension springs on a military vehicle. In the preferred embodiment, the structure comprises a set of plates having tapered edges insertable between the coils of the spring. When the spring expands or contracts beyond a predetermined limit, the plates engage the coils so as to stiffen the spring. The plates can be spaced or dimensioned to engage the coils sequentially as the spring contracts, thereby stiffening the spring in a progressive, stepwise fashion. The plates are moveable perpendicularly toward or away from the longitudinal axis of the spring to vary the width of the tapered plate portion sandwiched between the coils when the spring compresses. This plate movement is a further means to control the degree to which my spring modification structure changes the stiffness of the spring.

DETAILED DESCRIPTION

Figure 1:
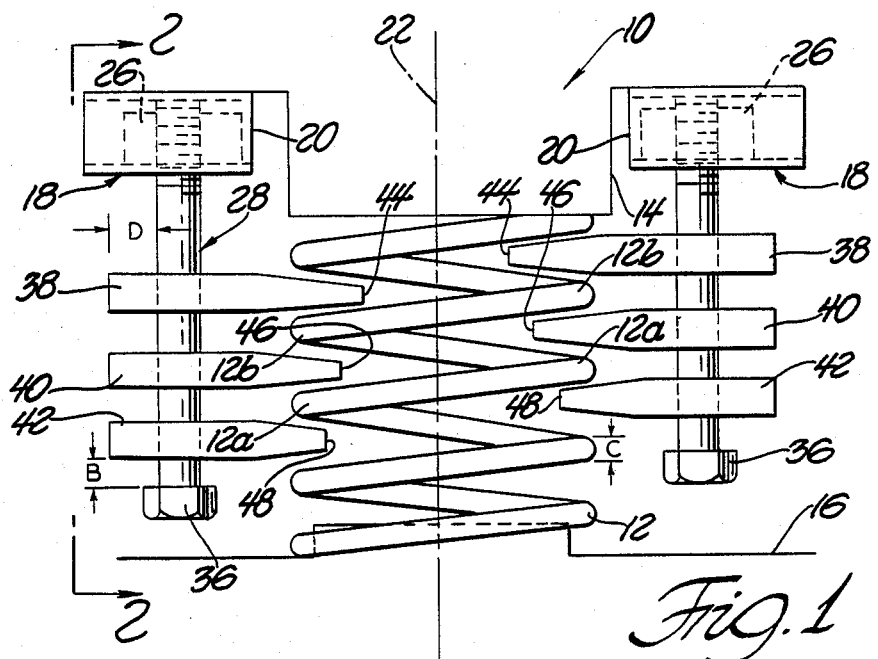
FIG. 1 is a side elevational view of the preferred embodiment of my invention showing sets of taper-edged plates interposed between coils of a simple suspension spring.
Figure 2:
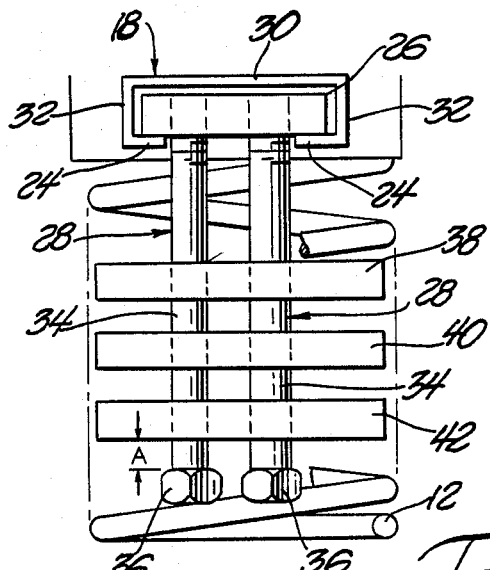
FIG. 2 is view taken along line 2—2 in FIG. 1.

FIG. 1 shows the preferred embodiment of the modified spring assembly 10 having a conventional linear coil spring 12 mounted between a suspension member 16 of a military vehicle and a frame member 14 of the vehicle. Mounted on frame member 14 are generally rectangularly shaped channels 18 which are open at either end. One of the open ends 20 of each channel 18 faces toward the centerline, or longitudinal axis 22 of the coil spring 12. On the lower side of channels 18, as seen in FIG. 2, are flanges 24 extending from sidewalls 32 of channel 18, the free ends of flanges 24 defining therebetween a gap running from one end of the channel to the other. A bearing block 26 is slideably mounted within each channel so that the lateral edges of the block are disposed above flanges 24. Extending through the bearing blocks 26 are pairs of bolts 28, the threaded ends of the bolts matingly engaged with threaded apertures in blocks 26. Turning the bolts in one angular direction thrusts the tips of their threaded ends against web wall 30 of channel 18 and forces blocks 26 against flanges 24.

Between the threaded ends of the bolts and the heads 36 of the bolts are smooth circular shanks 34 where a series of parallel plates 38, 40, and 42 are translateably mounted. As best seen in FIG. 1, plates 38, 40, 42 have their respective identical tapered edges 44, 46, 48 inserted between individual coils of the spring 12. Each of the plates has a different horizontal dimension as seen in FIG. 1, so that the respective tapered edges protrude different distances into the spaces between the spring coils. Consequently, the respective tapered edges take up varying amounts of the axial distance between individual coils of spring 12. When spring 12 is compressed, individual pairs of coils will sequentially sandwich respective plates therebetween and these coils will thereupon be rendered inactive. As a result, the effective spring rate of spring 12 increases stepwise during its compression.

The plates may be all of the same thickness, but it may be preferable in some instances to use plates not having the same thickness or to use plates whose edges do not have the same degree of taper. It may also be preferred that the thickness, or axial dimension, of each tapered edge vary from its thinnest to its thickest part by more than one-half the axial dimension "C" (FIG. 1) of the stock from which the spring is made. In this way (assuming the plates are translated a sufficient distance away from longitudinal axis 22 of the spring 12) the plates will stack or collapse together after sufficient compression of the spring. The lowest plate in FIG. 1 (plate 42) will block upward movement of the coil beneath it so as to render coils 12a, 12b above plate 42 inactive and further stiffen spring 12.

The distance B in FIG. 1 between bolt head 36 and the lower surface of plate 42 is less than the maximum downward stretch of spring 12 from its rest position shown in FIG. 1. The maximum downward or upward travel of spring 12 from its rest position is typically determined by the stroke length of a shock absorber (not shown) connected between the suspension member 16 and frame member 14 of the vehicle. Member 16 moves away from member 14 as the vehicle rebounds from road or terrain shocks, causing spring 12 to expand so that coil 12a urges plates 42 toward bolt head 36. During severe rebounding, coil 12a slides plate 42 along bolt 28 until it is stopped by bolt head 36. Thereupon coil 12a and the coils above it are rendered inactive, whereby spring 12 is effectively shortened and stiffened to more effectively inhibit rebounding motion of the vehicle.

The position of the plates may be adjusted by first turning bolts 36 until their threaded ends disengage the web wall 30 of channel 18, whereupon block 26 ceases to bear against the channel flanges 24. Block 26, plates 38, 40, 42, and bolts 36 can then be moved as a subassembly along channel 18 toward or away from spring 12. Bolts 36 can subsequently be used to fix the subassembly in its new position on channel 18.

Figure 3:
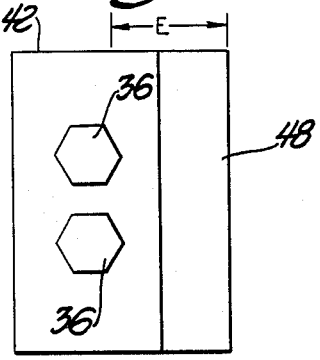
FIG. 3 is a plan view of one of the plates shown in FIG. 1.

Bolts 28 can be completely unscrewed from bearing block 26 so that the plates can be slid off the bolts. The bolts have the same maximum outer shank diameter, and the complimentary plate holes for receiving the bolt shanks have diameters equal to each other. Consequently one or more of the plates can be replaced upon the bolts in a position turned 180 degrees from their FIG. 1 position, so that the tapered edges of the plates are pointing away from the spring. The distance between the bolts and the nontapered edges (dimension "D", FIG. 1) is smaller than dimension "E" (FIG. 3) between the bolt and the tip of tapered edge 48 of the narrowest plate 42. Because of this special dimensioning, the tapered edge of any plate can engage spring 12 while no untapered plate edges turned toward spring 12 will actually engage the spring.

Figure 4:
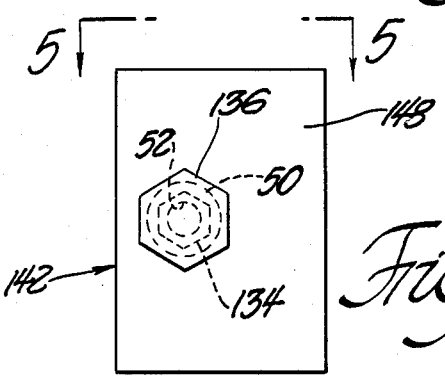
FIG. 4 shows a plan view of a plate for an alternate embodiment of my invention.
Figure 5:
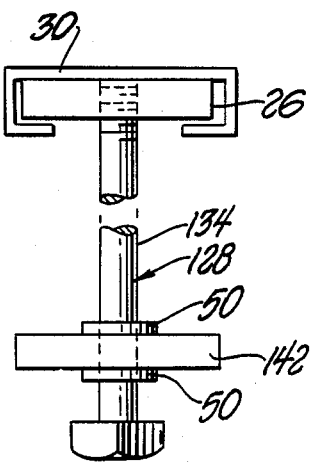
FIG. 5 is a view taken along line 5—5 in FIG. 4.

FIGS. 4 and 5 show a modified plate and bolt configuration which can be used in my invention. In FIGS. 4 and 5, plate 142 accomodates a single bolt 128 passing therethrough. Fixed to opposed surfaces of plate 142 are washer-like elastomeric members 50 having round holes 52 in registry with the hole in plate 142. The hexagonal shank portion 134 of bolt 128 is interferingly and elastically engaged by the elastomeric bodies 50 so that plate 142 does not rotate freely about bolt 128. Elastomeric bodies 50 should be sufficiently flexible to permit plate 142 to be rotated by hand about the axis of bolt 128. At the same time, elastomeric bodies 50 should be stiff enough to retain plate 142 in whatever angular position it is placed in by hand. The threaded end of bolt 128 engages bearing block 26 and web wall 30 in the same fashion that bolt 28 embodiment engages bearing block 26 and web wall 30 in the FIG. 1 embodiment. Edge zone 148 of plate 142 extends between coils of spring 12 (not shown in FIGS. 3 and 4). Plate 148 can be rotated 180 degrees by hand so that no part of plate 142 is between coils of spring 12. A plurality of plates 142 may be mounted on bolt 128, and may be selectively inserted or removed from between coils of spring 12 to adjust the response of spring 12 to shocks received by the vehicle.

I wish it to be understood that I do not desire to be limited to the exact details of the construction shown and described. Obvious modifications may occur to those skilled in the art without departing from the spirit and scope of the appended claims.

I claim:

1. A variable-stiffness spring assembly for a vehicle suspension, comprising:
    a coil spring fastened between a body member of the vehicle and a suspension member of the vehicle;
    a channel fixed to one of the members, the channel having one end relatively proximal to the spring and the other end relatively distal to the spring;
    a bearing block closely fit within the channel and slideably retained therein, the block having a pair of cylindrical threaded cavities extending therethrough;
    a pair of bolts having a smooth, circular shank portion intermediate their ends and having a threaded end engaged with and extendable completely through respective cavities in the bearing block to engage an inner peripheral surface of the channel, the bolts being disposed generally parallel to the longitudinal axis of the spring;
    a plurality of plates having apertures to accommodate sliding engagement between the plates and the smooth shank portions of the bolts, the plates each having an edge zone tapered away from the bolts and extended between coils of the spring, the distance between the tapered edge zone and the bolts being different for each plate.

2. The spring assembly of claim 1 wherein the configuration for the taperd zone for each plate is the same.

3. The spring assembly of claim 2 wherein the distance between the bolts and the edges of the plates opposite the tapered zones is less than the distance between the bolts and the edges of the plates disposed along the tapered zones.

4. The spring assembly of claim 3 wherein each plate has a single elongate aperture for accommodating sliding engagement between the bolts and the plate, the longitudinal axis of the aperture extending normal to the longitudinal axis of the channel, the width of the aperture being equal to the diameter of the shank portion of the bolts, and the ends of the aperture bearing against the shank portions of the bolts.

5. The spring assembly of claim 4 wherein the maximum diameter of the threaded ends of the bolts is no greater than the diameter of the smooth shank portion of the bolts.

6. A device detachably mounted to the vehicle for adjusting the stiffness of a spring assembly of a vehicle suspension, the device comprising;
   a simple coil spring fastened between a body member of the vehicle and a moveable suspension member of the vehicle;
   a generally rectangular channel fixed to one of the members, the channel having one end relatively proximal to the spring and the other end relatively distal to the spring, the channel having a bearing wall mounted to the one member, a pair of sidewalls extending away from the the bearing wall, and a pair of flanges, each flange extending parallel to the bearing wall from the edge of one sidewall toward the other sidewall, the flanges defining therebetween a longitudinal gap extending the length of the channel;
   a bearing block closely fit within the channel and slideable therein, the block having a cylindrical threaded cavity extending therethrough, one end of the cavity open toward the bearing wall and the other end of the cavity open toward the longitudinal gap between the flanges;
   a bolt having a polygonally cross-sectionally shaped shank portion intermediate its ends, one bolt end threaded through the cavity in the bearing block, the bolt being disposed generally parallel to the longitudinal axis of the spring;
   a plurality of plates having apertures to accommodate the shank portion of the bolt, the plates each having an edge zone extended between coils of the spring, the distance between the edge zone and the bolt being different for each plate;
   an elastomeric member fixed to each plate having a hole in registry with the aperture in the plate, the inner peripheral surface of the hole interferingly engaging the shank portion of the bolt.

7. The spring assembly of claim 6 wherein the distance between the plates during the free state of the spring is at least as great as the axial dimension of a coil segment of the spring, whereby the plates do not collapse together when the spring is compressed.

8. The spring assembly of claim 7 wherein the plates are all of differing thickness.

9. The spring assembly of claim 8 wherein the elastomeric members are an essentially washer shaped members fixed to faces of the plates.

10. A spring assembly for the suspension of a multi-terrain military vehicle having detachablye mounted to the vehicle a device for adjusting the stiffness of the spring assembly, the spring assembly comprising:
    a coil spring fastened between a body member of the vehicle and a moveable suspension member of the vehicle;
    a generally rectangular channel fixed to one of the members, the channel having one end relatively proximal to the spring and the other end relatively distal to the spring;
    a bearing block closely fit within the channel and slideably retained therein, the block having at least one cylindrical threaded cavity extending therethrough;
    a bolt having a smooth shank portion intermediate its ends and having one bolt end threadingly protruding through the cavity in the bearing clock to engage a channel wall, the bolt being disposed generally parallel to the longitudinal axis of the spring;
    a plurality of plates having apertures to accommodate sliding engagement between the plates and the shank portion of the bolt, the plates each having a tapered edge zone extended between coils of the spring, the distance between the edge zone and the bolt being different for each plate.

* * * * *